J. C. SIMPSON.
Horse Clothing.
No. 9,629. Reissued March 29, 1881.
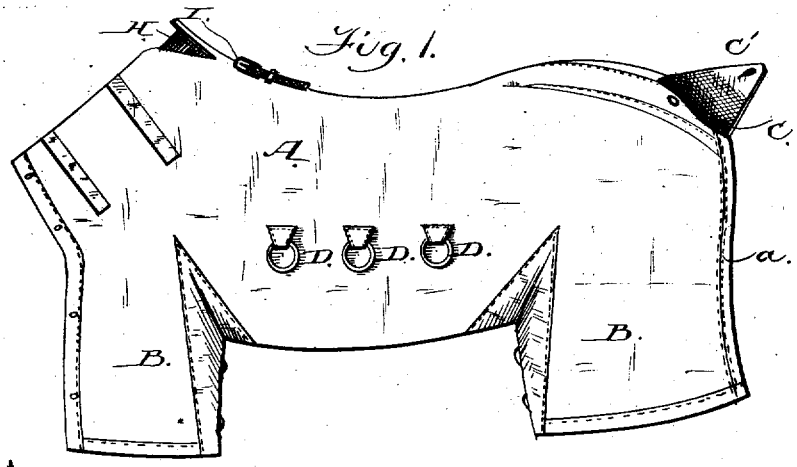
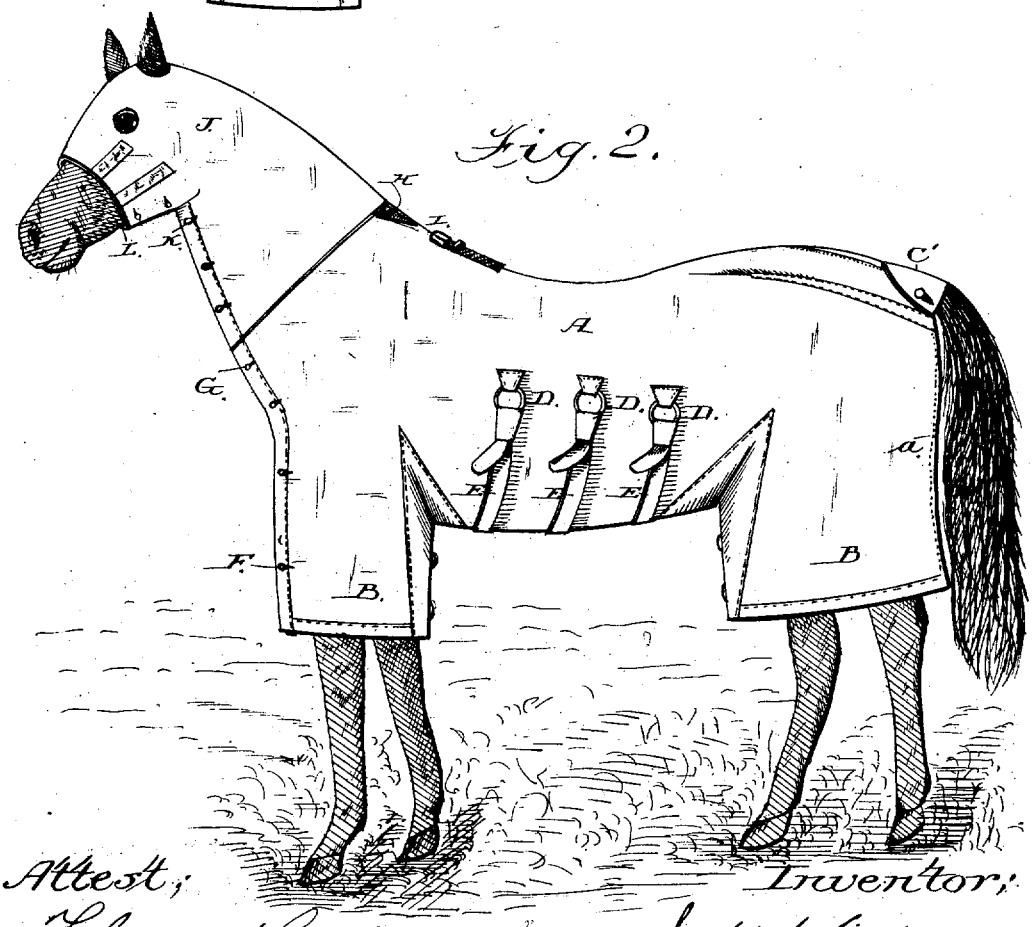
Attest;
Walter Fowler
Jno. L. Condron
Inventor;
Joseph C. Simpson
per attys A. St. Evans & Co
N. PETERS, PHOTO-LITHOGRAPHER, WASHINGTON, D. C.

UNITED STATES PATENT OFFICE.

JOSEPH C. SIMPSON, OF OAKLAND, CALIFORNIA.

HORSE-CLOTHING.

SPECIFICATION forming part of Reissued Letters Patent No. 9,629, dated March 29, 1881.

Original No. 215,983, dated May 27, 1879. Application for reissue filed February 12, 1881.

*To all whom it may concern:*

Be it known that I, JOSEPH C. SIMPSON, of Oakland, county of Alameda and State of California, have invented Improvements in Horse-Clothing; and I hereby declare the following to be a full, clear, and exact desctiption thereof, reference being made to the accompanying drawings.

My invention relates to an improvement in horse blankets or clothing; and my improvements consist in certain details of construction by which the blankets more perfectly protect the horse, while at the same time his clothing is such as to be more comfortable than that ordinarily made.

Ordinary blankets for horses are made usually square, and are held in place by one or more surcingles about the body of the horse, or buckles across the chest. When put on in this way the blanket is tightly held in some places and loose in others. It has to be strapped on tight in order to be kept in place, and where the straps occur the horse is apt to be chafed. He will then rub against the stall to relieve himself of the itching which he feels at the points where the straps or surcingles are, in order to get the blanket or covering off, showing that it is uncomfortable to him.

The blanket or clothing which I propose to use is made to conform to the shape of the horse, the same as clothes are fitted to a man, by measurement, and cutting the cloth so that it will fit to the inequalities of the surface.

Figures 1 and 2 are views of my device.

The blanket A is made of any suitable material, cut to fit the shape of the horse, and having the extensions B, which may reach down to the knees or to any desired distance. These extensions are formed so as to inclose the front and hind legs loosely, as shown, and are cut with angular pieces, so as to connect smoothly with that portion which fits around the body. The rear ends of the two sides are permanently joined together, as shown at *a*, an opening, *c*, being left at the proper point through which the tail may project. This opening is left large enough for the tail to be passed through as the blanket is put on, and a flap, C′, is buttoned over it. This rear inner portion of the blanket is lined with oil-silk, rubber, or similar material, so that it will not be likely to be soiled.

On the side of the blanket, at that part which covers the body of the horse, are three or more rings, D, and below them on the same side are secured a corresponding number of straps or bands, E. On the opposite side of the blanket, but lower down, are a series of rings, and these straps lead through them and then up to the rings D, where they are secured, thus holding the blanket in position. These straps or bands may be drawn up to suit circumstances and are always attached to the blankets, thus doing away with all surcingles or independent straps.

On that part of the extension B connecting immediately with the body of the blanket are the buttons, at F, which hold the two sides together. The front portion of the blanket has also a row of buttons, G, which, by fitting into corresponding holes, join the two parts together at this point, thus completely enveloping the horse.

On the upper part of the neck is inserted a piece of elastic material, as shown at H, so that the blanket will, even when closely fitted, adapt itself to any position of the neck. Back of this elastic material H is a strip of elastic, I, having a buckle at its end, by means of which the hood J is attached to the main blanket. By thus attaching the hood it will be brought back to its original place when the horse raises his head, thus obviating the danger to the eyes when the head is lowered. This hood J is buttoned on by means of the buttons K, and is fitted to the head as nicely as the blanket to the body. At the nose of the hood is an elastic band, L, to which the buttons are secured, in order that the hood may be kept snug in place, and at the same time allow motion of the jaws while eating.

It will be seen that blankets or clothing for horses made in the manner herein described will not be liable to fall or be rubbed off. Although made snug to the form and close fitting, they will not be uncomfortable to the horse. The horse will be completely covered, from the knees and hocks to the nose, in a closely-fitting garment, so constructed and secured as to allow freedom of motion to the animal without being too tight at any particular point. With this covering the horse is thoroughly protected from the cold, and by having the body bands or straps secured to the blanket itself, no loose or extra straps or surcingles are required to keep the blanket in its proper position.

Having thus described my invention, what I claim as new, and desire to secure by Letters Patent, is—

1. An improved blanket or covering, consisting of the body-piece A, flap C′, and the extensions B, formed or united together, so as to cover the body and legs of the animal, substantially as herein described.

2. The blanket or covering A, having the flap C′, and the extensions B, to fit the fore and hind legs of the animal, front fastenings, F G, and the permanent straps or bands E, substantially as and for the purpose herein described.

3. The blanket or covering A, with its extensions B, permanent securing-bands E, and the front fastenings, F G, in combination with the elastic neck-extension H, substantially as and for the purpose herein described.

4. The blanket A and hood J, in combination with the elastic connecting-strip I, substantially as described, and for the purpose set forth.

5. The close-fitting hood J, having the elastic band L beneath the jaws, so that they may be allowed to move without disturbing the fit, and adapted to be secured to the cover by means of straps, substantially as herein described.

6. The improvement in covering-blankets for animals, consisting of the blanket A, having the flap C′, and permanent straps or bands fixed to it to secure it around the body, whereby the use of loose surcingles is avoided, substantially as herein described.

In witness whereof I have hereunto set my hand.

JOSEPH CAIRN SIMPSON.

Witnesses:
J. H. BLOOD,
FRANK A. BROOKS.